May 15, 1934.   W. L. DAWSON   1,958,612
PHOTOGRAPHIC PROCESS
Filed April 28, 1931   2 Sheets-Sheet 1
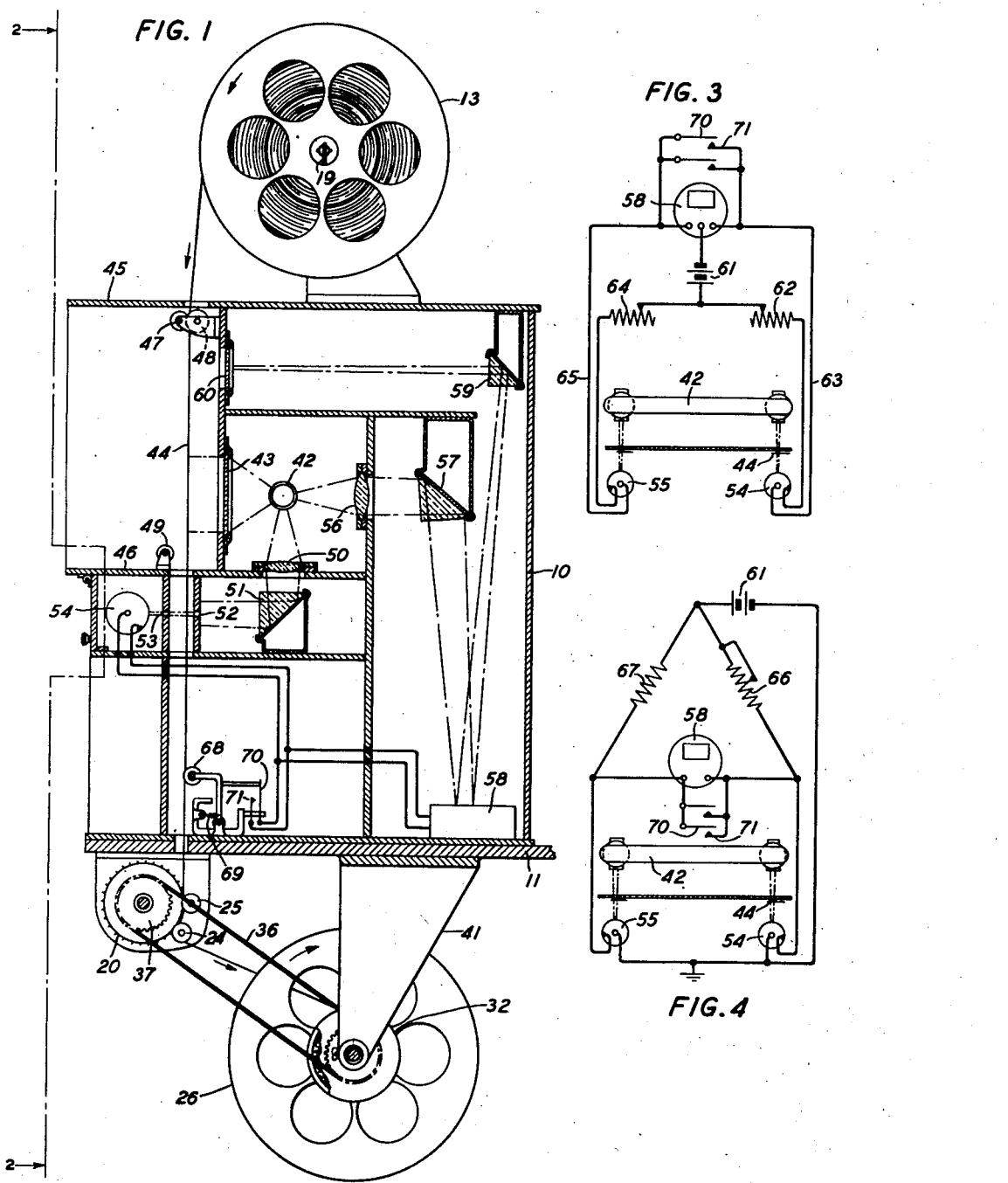
INVENTOR
W. L. DAWSON
BY
G. H. Heydt.
ATTORNEY

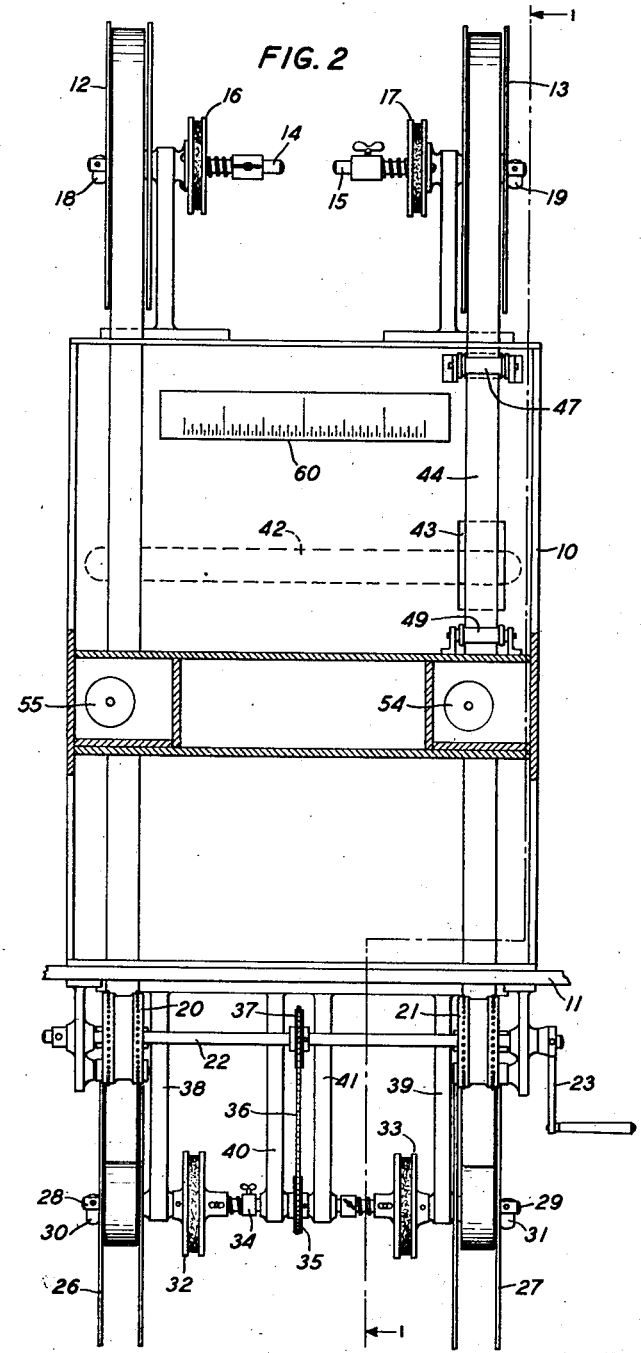

Patented May 15, 1934

1,958,612

UNITED STATES PATENT OFFICE 1,958,612

PHOTOGRAPHIC PROCESS

Wilfrid L. Dawson, New York, N. Y., assignor to Bell Telephone Laboratories, Incorporated, New York, N. Y., a corporation of New York Application April 28, 1931, Serial No. 533,380

3 Claims. (Cl. 88—14)

This invention relates to the production of photographic impressions and has for its object a method and means for rapidly inspecting a photograpic impression.

A feature of the invention is a method of comparing a photographic impression made by regular production methods with a standard photographic impression.

Another feature of the invention relates to the use of light sensitive devices arranged in a bridge circuit to indicate any marked difference between the transmission of the standard photographic impression and the production photographic impression under test.

For convenience of description, the method has been applied to the testing of positive film sound prints, but it will be apparent that the method is applicable to the comparison of the transmission of any two photographic impressions, and is not limited to the particular use illustrated.

After the various scenes of a sound picture production have been filmed, the negative film is edited and assembled into reels of convenient length usually about 1000 feet. Positive prints are made from the original negative and from these positive prints, master negative films may be printed. The printing and development of these positive prints and master negative films may be carefully controlled to produce the desired values of density and contrast. The master negative films may then be sent to processing laboratories, either in the country where the production was filmed or in other countries, and positive films printed from the master negative films for reproduction in the theatre.

In the case of a motion picture positive film, a visual inspection of the film after being developed, fixed, and dried will usually be sufficient to insure a high standard of quality. It is well known, however, that the volume of the sound reproduced from a film sound record varies with the average transmission of the sound record. Thus, in the case of a positive film sound record a visual inspection of the sound record is not sufficient to detect a change in the average transmission which may produce a serious change in the volume of the sound reproduced.

In accordance with the present invention a positive print, which may be termed the standard print, is printed from the master negative film and developed with great care to insure that the transmission of the sound record of the standard print is in the center of the allowable range of transmissions. The standard print is supplied to the processing laboratories together with the master negative film. Positive prints, which may be termed production prints, may then be prepared from the master negative film and visually inspected in the usual manner. Simultaneously with the visual inspection, or at some other suitable time, the sound record on the production print is compared with the sound record on the standard print. In a preferred embodiment of the invention, the standard print and production print are simultaneously moved by a double feed sprocket through two small beams of light each scanning one of the sound records and both preferably from the same source of light. Two photo-sensitive devices are arranged in opposition in a bridge circuit to differentially affect an indicating device. The circuit is initially adjusted so that equal transmission of the two films will not produce any effect on the indicating device. If the transmission of the production print is not equal to the transmission of the standard print, the unbalanced condition of the bridge circuit will affect the indicating device and furnish a warning that the production processes require adjustment.

In the drawings:

Fig. 1 is a side elevation in part section of an apparatus embodying the invention;

Fig. 2 is a front elevation in part section of the apparatus shown in Fig. 1; and Figs. 3 and 4 are alternative schematic representations of the circuit incorporated in the apparatus.

A cabinet 10 is placed on the work table 11 and supports two feed reels 12 and 13. The standard film may be contained on the reel 12, while the production print is contained on the reel 13. The reels 12 and 13 are supported on suitable shafts 14 and 15 which are preferably equipped with friction devices 16 and 17 for maintaining an even tension on the film and to prevent over-running. The reels 12 and 13 are retained on the shafts 14 and 15, by simple latches 18 and 19, which permit the reels to be readily changed.

The films are threaded through suitable openings in the top and bottom of the cabinet 10 and table 11 to the drive sprockets 20, 21 mounted on the common shaft 22 which may be rotated by the crank 23. Idler rollers 24, 25 associated with each sprocket retain the film in engagement with its associated sprocket, and guide the films to the take-up reels 26 and 27. The take-up reels 26 and 27 are retained on the shafts 28 and 29 by latches 30 and 31. Shafts 28 and 29 are driven through friction clutches 32 and 33 from the common shaft 34. Keyed to the shaft 34 is a sprocket 35 driven by the chain 36 from the sprocket 37 keyed to shaft 22. The drive and take-up mechanism may be conveniently supported by brackets 38, 39, 40 and 41 suitably journalled to retain the mechanism and attached to the under surface of the table 11. The sprockets 20, 21 may be of large diameter in order that the film may be inspected at high speed and a suitable motor drive may replace the hand-crank 23.

A lamp 42 is contained in a compartment formed in the cabinet 10 and illuminates a diffusing screen 43 placed in an opening in the wall of the cabinet 10 in line with the production print 44. The lamp 42 may be one of the long tubular incandescent lamps used to illuminate a show case, or a lamp of the gaseous discharge type such as a mercury vapor or Moore light. Preferably the lamp 42 extends across the greater part of the width of the cabinet 10, though separate lamps fed from the same source of power may be used. The diffused light shining through the screen 43 illuminates the pictures on the film 44 and enables the operator to make a visual inspection of the pictures. The cabinet 10 is preferably formed with the extensions 45, 46 to prevent external light from shining across the film so that visual inspection of the film will be rendered easier. The idler rollers 47, 48 guide and retain the production print 44 at the upper end. The idler roller 49 permits the film 44 to be drawn forward without chafing against the edge of the cabinet for a closer inspection, or for the removal of a defective picture and the splicing of the film. When a portion of the film has been removed, the reel 26 is held stationary while reel 12 is rotated until the two films are again in alignment. The clutches 16, 17 permit the reels 12, 13 to slip enough to restore alignment.

Light from lamp 42 is collected by the lens 50 and directed to a totally reflecting prism or mirror 51 suitably mounted in a compartment of the cabinet 10. The light reflected from the prism 51 illuminates a small slot 52 in the wall of the compartment aligned with the sound record of the production print. The modulated light transmitted through the sound record passes through a small slot 53 and excites a light sensitive device 54 contained in a small light-tight compartment constructed in the cabinet 10. A similar lens, prism and slot arrangement (not shown) simultaneously scans the sound record on the standard film and excites the light sensitive device 55. Known types of idler rollers or pressure feet may be used to steady the films in the scanning lights though such devices are not usually necessary.

Light from lamp 42 is also collected by lens 56 and directed to a totally reflecting prism or mirror 57 suitably mounted in the cabinet 10. The light reflected from the prism 57 falls on the mirror of a galvanometer 58 and is reflected back to a prism 59 which directs the beam to a translucent screen 60 conveniently located in front of the operator.

In Fig. 3 current is supplied from battery 61 through variable resistor 62 to the light sensitive device 54, through wire 63 to one winding of the differentially wound galvanometer 58 to battery 61. Similarly, current is supplied from battery 61 through variable resistor 64 to the light sensitive device 55 through wire 65 to the other winding of the differentially wound galvanometer 50 to battery 61. The light from the lamp 42 is transmitted through the production print 44 and excites the device 54, while simultaneously light from lamp 42 is transmitted through the standard film and excites the device 55. Before the films are threaded through the cabinet 10 the variable resistances 62 and 64 are adjusted so that the outputs of the devices 54 and 55 are equal and differentially affect the galvanometer 58 which will rest on the center zero of the screen 60. So long as the average transmissions of the standard film and production print are equal the meter 58 will remain on zero. If the average transmissions are unequal, the meter 58 will be deflected from the zero reading and will indicate the degree of unbalance of the outputs of the devices 54 and 55.

In Fig. 4 a standard single winding galvanometer may be used in place of the differentially wound galvanometer used in Fig. 3. The devices 54 and 55 are arranged as two arms of a bridge circuit which is completed with the resistors 66 and 67. The galvanometer 58 and battery 61 are connected as usual to the corners of the bridge circuit. The galvanometer 58 again will indicate the degree of unbalance of the outputs of the devices 54 and 55.

Owing to the unequal shrinkage of the photographic prints it would be very difficult to move two separate films so that at all times the corresponding striations will be scanned, and the deflections of the galvanometer 58 would indicate any error in correspondence. To avoid a false deflection, the scanning slots 52 are made much larger than the normal size used in sound reproducing. Satisfactory results may be obtained if the scanning slots are of the order of 10 times the usual size lengthwise of the film. The output of the light sensitive devices will then be the integrated result of 10 times the usual number of striations. The integrating effect may be further aided by using an over-damped or ballistic galvanometer as the indicating device.

As both of the light sensitive devices 54 and 55 are excited by a common light source 42 and are in a balanced relation, a variation in the light source 42 will affect both devices equally and thus will not cause an unbalanced condition.

The removal of one film when the other film is in position will produce a very large degree of unbalance and the resultant violent deflection may injure the meter 58. As shown in Fig. 1, an idler roller 68 is pressed against the film 44 by a spring 69. When the film 44 is removed, the roller 68 is drawn forward and the contacts 70 and 71 place a short circuit around the meter 58 and prevent the meter from deflecting. A similar roller (not shown) bears on the standard print and the two pairs of contacts are in parallel.

What is claimed is:

1. In combination, a standard print of a photographic negative produced under controlled conditions, a production print of said negative produced under production conditions means for controllably moving both said prints, a source of light illumining a small area of each of said prints, a light sensitive device excited by the illumined area of said standard print, a second light sensitive device excited by the illumined area of said production print, said devices being connected in opposed relation, means for indicating the degree of unbalance of the outputs of said devices, means controlled by said standard print for rendering said indicating means inoperative and other means controlled by said production print for rendering said indicating means inoperative.

2. In combination, a standard print of a photographic negative produced under controlled conditions, a production print of said negative produced under production conditions, means for controllably moving both said prints, a source of light illumining a small area of each of said prints, a light sensitive device excited by the illumined area of said standard print, a second light sensitive device excited by the illumined area of said production print, said devices being connected in opposed relation, means for indicating the degree of unbalance of the outputs of said devices, a normally closed switch connected in parallel relation with said indicating means, means controlled by said standard print for retaining said switch in an open condition, a second normally closed switch connected in parallel relation with said indicating means, and means controlled by said production print for retaining said second switch in an open condition.

3. In combination, a standard print of a photographic sound record produced under controlled conditions, a production print of said sound record produced under production conditions, means for controllably moving both said prints, a source of light, means for masking said light to illume an area of each of said prints materially larger lengthwise of said prints than the normal scanning area, a light sensitive device excited by the illumined area of said standard print, a second light sensitive device excited by the illumined area of said production print, said devices being connected in opposed relation and an overdamped galvanometer for indicating the degree of unbalance between the integrated outputs of said devices.

WILFRID L. DAWSON.